(12) United States Patent
Akagi et al.

(10) Patent No.: US 6,862,153 B2
(45) Date of Patent: Mar. 1, 2005

(54) APPARATUS FOR LATCHING A MAGNETIC DISK

(75) Inventors: Kyo Akagi, Fuchuu (JP); Takashi Yamaguchi, Tsuchiura (JP); Koki Uefune, Odawara (JP); Motoyasu Tsunoda, Sagamihara (JP); Atsushi Saito, Chigasaki (JP)

(73) Assignee: Hitachi, Ltd., Tokyo (JP)

(*) Notice: Subject to any disclaimer, the term of this patent is extended or adjusted under 35 U.S.C. 154(b) by 200 days.

(21) Appl. No.: 09/901,889

(22) Filed: Jul. 11, 2001

(65) Prior Publication Data

US 2002/0027735 A1 Mar. 7, 2002

(30) Foreign Application Priority Data

Sep. 6, 2000 (JP) ........................................ 2000-274999

(51) Int. Cl.[7] .............................................. G11B 29/02
(52) U.S. Cl. ....................................................... 360/69
(58) Field of Search ............................. 360/55, 60, 69, 360/74.1, 75, 73.01, 73.03, 99.08

(56) References Cited

U.S. PATENT DOCUMENTS

| | | | | |
|---|---|---|---|---|
| 4,903,157 A | * | 2/1990 | Malek ...................... | 360/256.3 |
| 4,996,617 A | * | 2/1991 | Yaeger et al. ............ | 360/256.3 |
| 5,034,837 A | * | 7/1991 | Schmitz ................... | 360/256.2 |
| 5,157,566 A | * | 10/1992 | Hishikawa et al. ...... | 360/99.08 |
| 5,345,347 A | * | 9/1994 | Hopkins et al. .......... | 360/71 |
| 5,870,256 A | | 2/1999 | Khanna et al. | |
| 5,875,075 A | | 2/1999 | Hickox | |
| 5,877,922 A | | 3/1999 | Boutaghou | |
| 5,982,586 A | | 11/1999 | Scura | |
| 5,999,371 A | | 12/1999 | Wood et al. | |
| 6,061,207 A | * | 5/2000 | Jang ........................ | 360/256.3 |

FOREIGN PATENT DOCUMENTS

| | | | | |
|---|---|---|---|---|
| JP | 03100965 A | * | 4/1991 | ........... G11B/19/04 |
| JP | 05-036221 | | 2/1993 | |
| JP | 11-096699 | | 4/1999 | |
| JP | 11-238331 | | 8/1999 | |
| JP | 11-273277 | | 10/1999 | |

* cited by examiner

*Primary Examiner*—Sinh Tran
*Assistant Examiner*—Daniell L. Negrón Gómez
(74) *Attorney, Agent, or Firm*—Antonelli, Terry, Stout & Kraus, LLP

(57) ABSTRACT

A magnetic disk apparatus has: a magnetic disk having a magnetic film formed on a substrate; a spindle motor for rotating the magnetic disk; a magnetic head for writing/reading information on/from the magnetic disk; a supporting member for supporting the magnetic head; a driving mechanism for moving the magnetic head to a predetermined position on the magnetic disk; a magnetic writing/reading circuit for enabling the magnetic head to write/read information on/from the magnetic disk; an interface for sending/receiving signals for controlling the information to/from another information processing device, a device for detecting whether or not the magnetic disk apparatus is in operation; and mechanism for latching movable part of the magnetic disk apparatus on the basis of detection result of the detecting device.

12 Claims, 16 Drawing Sheets

APPARATUS FOR LATCHING A MAGNETIC DISK

BACKGROUND OF THE INVENTION

The present invention relates to a flexible magnetic disk apparatus and a rigid magnetic disk apparatus, more particularly to a magnetic disk apparatus having resistance properties against external impact and vibration.

Magnetic disk apparatus which have been installed in desktop computers heretofore are now becoming to be installed in portable (mobile) computers and information appliances other than computers. Consequently, their possibilities to receive disturbance are becoming higher. Troubles of those magnetic disk apparatus caused by such disturbances are roughly classified into two types; troubles in non-operation in which information writing/reading is performed and troubles in operation in which information writing/reading is stopped. The former troubles include deviation of magnetic disk rotation centers, damages of the magnetic disks and/or heads, and troubles in a spindle motor system used to rotationally drive the magnetic disks. The latter troubles, in addition to the former troubles, include information writing/reading errors, as well as magnetically destroy of recorded information, in the worst case.

JP-A-5-36221 specification discloses a magnetic disk apparatus that is detachable from an information processing apparatus to avoid the above-described troubles. The magnetic disk apparatus has a manually operated mechanism that mechanically locks both of a head arm for positioning a head and magnetic disks when the magnetic disk apparatus is detached from the information processing apparatus and unlocks them when the magnetic disk apparatus is attached to the information processing apparatus.

Further, unlike the above-described prior art in which the head arm and the magnetic disk are latched by manual operation, there are other known arts to latch those items automatically by mechanical or electrical operation as described hereinafter.

At first, a latch mechanism to latch a movable part of a head carriage with the use of inertia of the mechanism against vibrations and impact from the outside of a magnetic disk apparatus is disclosed in U.S. Pat. Nos. 5,870,256 and 5,875,075. A latch mechanism to latch a movable part of a head carriage electromagnetically in response to a trigger is disclosed in JP-A-11-96699 specification. A latch mechanism to latch a movable part of a head carriage with use of a piezoelectric element in response to a trigger is disclosed in JP-A-11-273277 specification. A latch mechanism to latch a movable part of a head carriage with use of a shape memory alloy in response to a trigger is disclosed in U.S. Pat. No. 5,982,586. A latch mechanism to latch a movable part of a head carriage with use of an air flow caused by the rotation of a disk is disclosed in U.S. Pat. No. 5,999,371. A latch mechanism in which the above-described inertial mechanism and electromagnetic means are combined is disclosed in U.S. Pat. No. 5,877,922. Each of the above-described devices uses means for latching a head carriage.

On the other hand, a latch mechanism in which part of a movable portion of a carriage comes into contact with an edge of a disk when the head is unloaded with the use of a loading/unloading mechanism of the head is disclosed in JP-A-11-238331 specification.

The mechanism disclosed in JP-A-5-36221 specification locks the movable part when the magnetic disk apparatus is detached from the information processing apparatus. When the magnetic disk apparatus is attached in the information processing apparatus, the condition of the magnetic disk apparatus is one in which the lock has been released. Therefore, there is a possibility that the following disadvantages occur.

When a mobile computer and/or an information appliance itself is carried, there are much possibilities to give an impact to the magnetic disk apparatus by an accident to drop the mobile computer and/or the information appliance with the magnetic disk drive installed therein. Any of the prior arts described above gives no consideration to the external impact to be applied to the magnetic disk apparatus installed in the host information processing device. Further, there is possibility to result fretting wear at a bearing portion of a disk spindle by vibration from the outside.

In the latching mechanisms of the inertia and/or electromagnetic means, the head carriage is latched when the magnetic disk drive is in non-operation independent of existence of a host machine. Each of the above-described prior arts except the art disclosed in JP-A-11-238331 specification just relates to a mechanism that latches the head. The mechanism disclosed in JP-A-11-238331 specification is structured so that a stopper operationally associated with the head carriage comes in contact with an edge portion of the disk when the head is in an unloaded state (when the head is parking on ramp). Consequently, unless the rotation of the disk is stopped at the moment the head is unloaded, the stopper will come in contact with the rotating disk, thereby the edge of the disk is worn or, the disk is damaged in the worst case. In addition, the mechanism is structured so that the disk is pressed at one circumferential point of the disk in the radial direction, so that there is possibility that fixing position of the magnetic disk with respect to the spindle motor might be deviated from its regular position.

In the case of effecting random data writing/reading, the rate of the reading/writing time to the whole operation time of the magnetic disk apparatus for the consumer use is 1% or less. Consequently, even when the magnetic disk apparatus is in a condition that it is installed in a mobile computer or an information appliance, the magnetic disk apparatus does not effect its primary operation during almost time. On the other hand, in the case of effecting sequential data writing/reading, writing/reading is continuously effected and the magnetic disk apparatus is always exposed to the menace of impacts, vibrations, etc.

OBJECT AND SUMMARY OF THE INVENTION

In view of the above-described circumstances, the present invention is invented and an object of the present invention is to provide a magnetic disk apparatus having sufficient resistance against external disturbances even when it is installed in a mobile computer, an information appliance, or the like.

In order to attain the above object, a magnetic disk apparatus of the present invention has a structure in which while monitoring electrical connection to a mobile computer or an information appliance in which the magnetic disk apparatus is installed or electrical connection to another information processing device (to be referred to as a "host apparatus" for convenience sake, but not limited only to a general "host" computer that drivingly controls the magnetic disk apparatus) to which data is transferred, the magnetic disk and the magnetic head are unlatched only when the rotation of the magnetic disk and the drive of the magnetic head are required and they are always latched in other states.

From the host apparatus, command for mechanically moving the magnetic disk and the magnetic head such as recording command of information to be written in the magnetic disk apparatus, reading command for data reading, head seek command for correction movement for measurement of an external force of a magnetic head driving actuator, etc. are issued. When there is no electrical connection to the host apparatus or when these command are not issued from the host apparatus for a predetermined time even when there is electrical connection to the host apparatus, the magnetic disk and the magnetic head are latched by the latching means of the present invention. Understandably, before the latching and after the unlatching, rotation stop operation and rotation start operation of the magnetic disk and moving operation of the head to the latch position occur. When the magnetic disk is 30 mm or less in diameter, the power consumption required for starting the rotation of the disk becomes 100 mW or less, so that the power consumption is not affected so much adversely even when the disk rotates and stops repetitively. In the sequential data writing/reading, rate that the head and the disk are latched becomes low but it is possible to heighten the rate by employing a large cache memory.

According to the present invention, it is possible to heighten resistance against the external impact and the external vibration by latching the magnetic disk and the magnetic head when command is not issued for a predetermined time while always monitoring the issuance of the above-described commands. As a mechanism to latch/unlatch those components, an electromagnetic latching mechanism configured by a coil and a magnet is effective.

By employing the above-described manner and structure, a magnetic disk apparatus of which resistance against the external force is improved and which is suitable for a mobile computer and/or an information appliance is realized.

DESCRIPTION OF THE EMBODIMENTS

Figure 1:
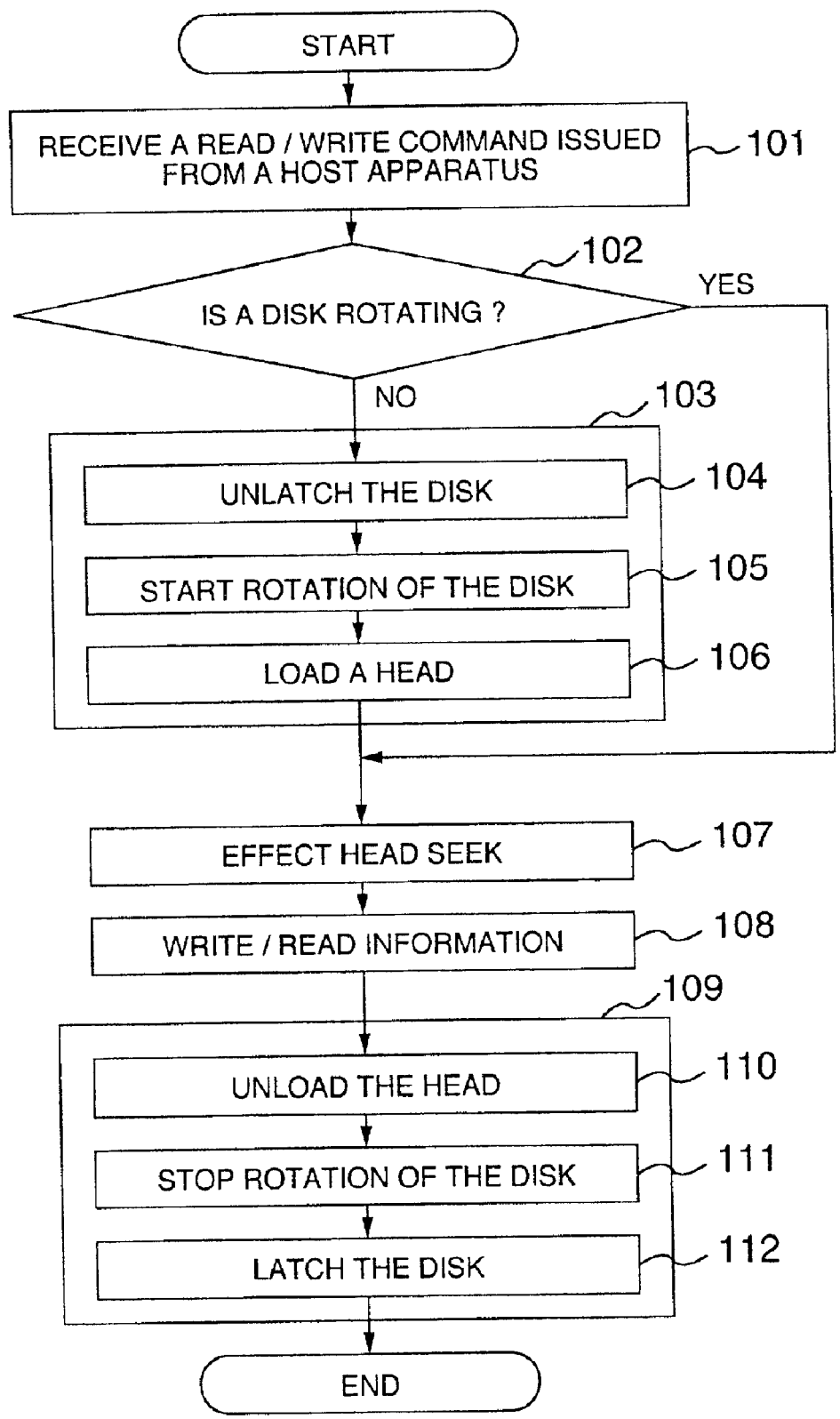
FIG. 1 is a flowchart showing a sequence of information writing/reading to a magnetic disk apparatus of the present invention.
Figure 2:
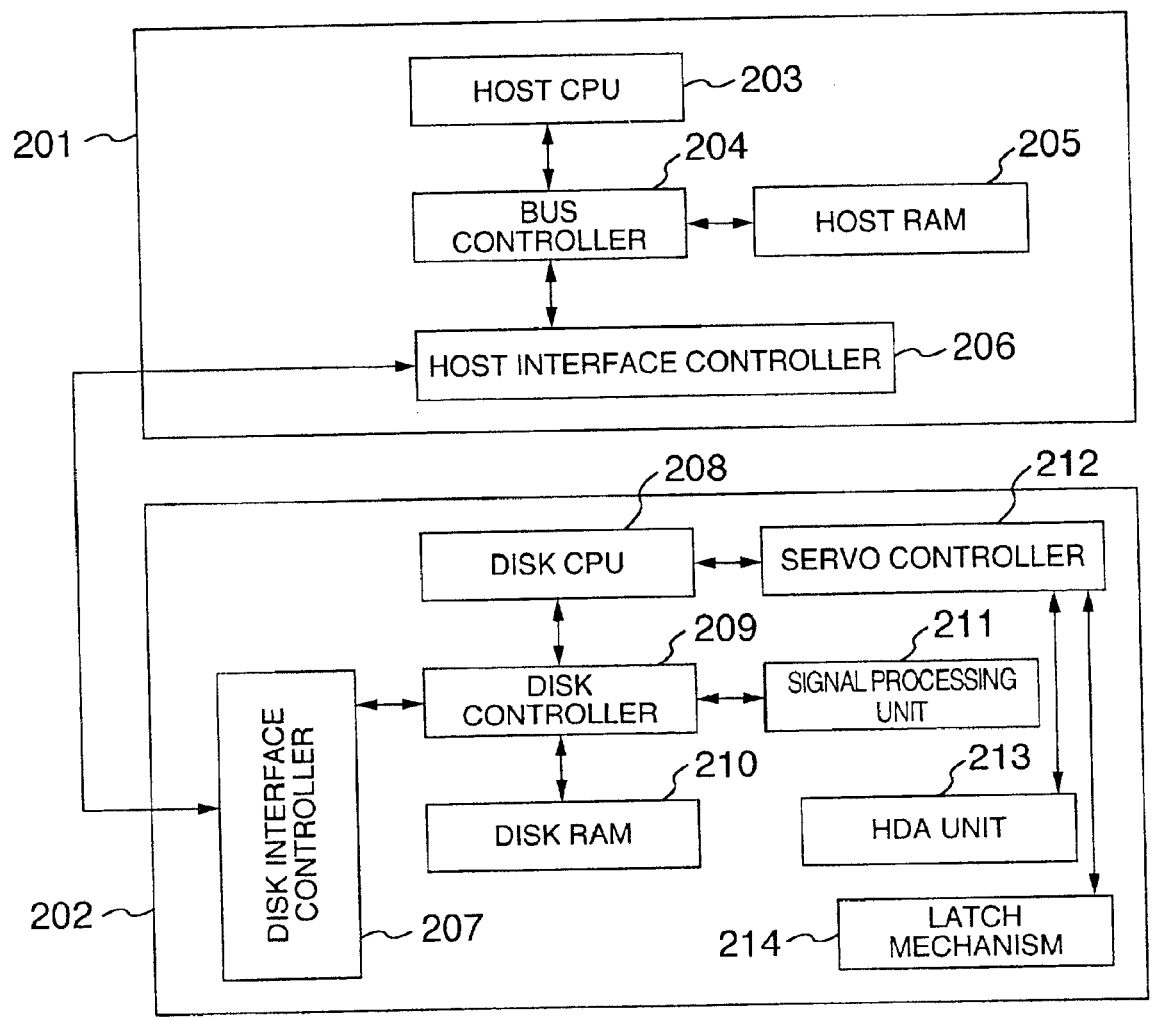
FIG. 2 is a block diagram showing a structure of a controlling system of an information processing system of the present invention.
Figure 3:
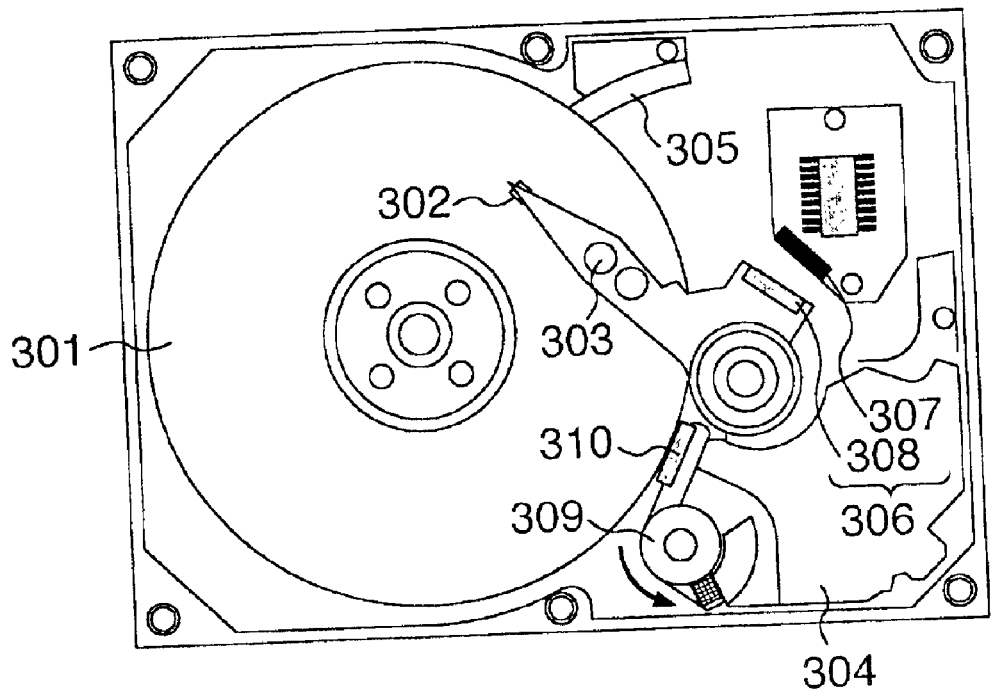
FIG. 3 is a view showing a structure of a first embodiment of a magnetic disk apparatus of the invention.
Figure 4:
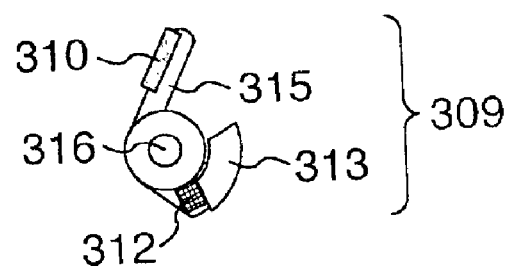
FIG. 4 is a plan view of a disk latch mechanism used in the first embodiment of the invention.
Figure 5:
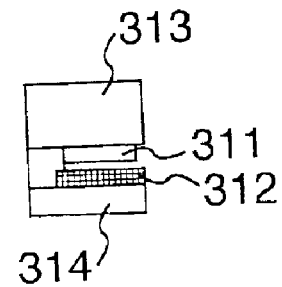
FIG. 5 is a side view of the disk latch mechanism used in the 1st embodiment of the invention.

FIG. 1 is a flowchart showing a sequence of information writing/reading to a magnetic disk apparatus of the present invention. FIG. 2 is a block diagram showing a structure of a controlling system of an information processing system comprising a magnetic disk apparatus of the invention and a host apparatus (personal computer or information appliance). FIGS. 3 to 5 show a first embodiment of the magnetic disk apparatus of the invention provided with a disk latching mechanism and a head latching mechanism.

Hereinafter, the present invention will be described with reference to the accompanied drawings.

Referring to FIG. 1, when a write/read command which is issued from a host apparatus is received (step 101), whether or not a magnetic disk is rotating is decided (step 102). When the disk is not rotating, a sequence for starting the rotation of the disk is effected (step 103). In the disk rotation start sequence, firstly, a disk latched by a disk latch mechanism is unlatched (step 104). Then, rotation of the disk is started (step 105) and a magnetic head is loaded (including unlatching operation of the magnetic head) (step 106). Then, a head seek is effected, that is, the magnetic head is moved to a predetermined track (step 107) to write/read necessary information on/from the magnetic disk (step 108). After this operation is completed, a disk stop sequence is effected at once (step 109). In the disk stop sequence, firstly, the head is unloaded (step 110), the rotation of the disk is stopped (step 111) and the disk is latched (step 112). The series of sequences is ended.

It is preferable that the disk rotation start sequence (step 103) is as short as possible in the light of the data access time. For example, it is preferable to take 50 msec or less for the disk unlatching (step 104), 50 msec or less for the disk rotation starting (step 105), and 100 msec or less for the head loading (step 106). Especially, the disk rotation starting (step 105) will satisfy the above value when the disk is 30 mm or less in diameter.

FIG. 2 shows a block diagram of a controlling system of an information processing system comprising a host apparatus 201 (for example, a personal computer or an information appliance) and a magnetic disk apparatus 202. In FIG. 2, the host apparatus 201 comprises a host CPU 203, a bus controller 204, a host RAM 205 and a host interface controller 206. The host apparatus 201 may also include other components, for example, a graphic controller for controlling display, a network controller for sending/receiving information to/from other information processing devices, a floppy disk apparatus used as another recording device, and input/output devices such as a floppy disk controller 104, for writing/reading the information on/from the floppy disk. The host CPU 203 executes commands in accordance with a preset program. The bus controller 204 controls data transferring among the host CPU 203, the host RAM 205, a ROM (not shown), and the host interface controller 206. The host interface controller 206 controls data transferring between a disk interface controller 207 of an external storage device (the magnetic disk apparatus 202 in this embodiment) and the host RAM 205.

On the other hand, the magnetic disk drive 202 comprises a disk CPU 208, a disk interface controller 207, a disk controller 209, a disk RAM 210, a signal processing unit 211, a servo controller 212, an HDA (Head-Disk Assembly) unit 213 and a latch mechanism 214. The disk CPU 208 controls the data processing of whole of the magnetic disk apparatus 202. The disk controller 209 controls data transferring between the disk interface controller 207 and the disk RAM 210, as well as between the signal processing unit 211 and the disk RAM 210. The HDA unit 213 comprises a recording medium for storing data, a spindle motor for rotationally driving the recording medium, a magnetic head for writing/reading data, an actuator for supporting the magnetic head, a voice coil motor for driving an actuator, a latching mechanism 214 for latching movable parts of the magnetic head, the spindle motor, the magnetic disk, and the like. The servo controller 212 controls the spindle motor, the voice coil motor, the latch mechanism 214.

FIG. 3 is a view showing a structure of a first embodiment of a magnetic disk apparatus of the invention. The magnetic disk apparatus comprises a magnetic disk 301; a supporting member 303, that is, a head actuator on which a head 302 movable above a surface of the magnetic disk is attached; a voice coil motor 304 for moving the supporting member 303; a loading/unloading mechanism 305 for supporting the evacuated head; a head latch mechanism 306 provided on the voice coil motor 304 for latching the voice coil motor unit when the head 302 is supported by the loading/ unloading mechanism 305; and a disk latch mechanism 309 for supporting a rotary part of the spindle motor so as to be latched when the spindle motor unit is stopped.

The magnetic head 302 is positioned on the magnetic disk as shown in FIG. 3 when information is written/read on/from the magnetic disk. Except for the information writing/ reading, the magnetic head is evacuated on the loading/ unloading mechanism 305.

When the magnetic head is evacuated on the loading/ unloading mechanism 305, the head latching mechanism 306 comprising a magnet 307 provided at a housing side and an iron piece 308 provided at a rotation side of the voice coil motor 304 functions, thereby the head 302 is latched firmly on the loading/unloading mechanism 305. The position where the head latch mechanism 306 is provided is not limited to the position shown in FIG. 3. It may be any position where the head supporting member, that is, the head actuator 303 or the head itself can be latched.

The disk latch mechanism 309 in this embodiment latches the disk 301 by moving a pad 310 in a direction to press against an edge of the disk 301 (in the direction of an arrow) in a disk rotation stopped state. FIGS. 4 and 5 show details of the disk latch mechanism 309. The disk latch mechanism 309 is driven by a component comprising a magnet 311, a coil 312 provided so as to oppose the magnet 311, an upper yoke 313 and a lower yoke 314. The upper yoke 313 and the magnet 311 have a structure to move the pad 310 supported by a supporting member 315 that moves together with the upper yoke 313 and the magnet 311 rotationally around a shaft 316. A force that presses the pad 310 against the edge of the disk 301 can be adjusted by magnitude of the electric current flowing in the coil 312. The disk latch mechanism 309 is described as a small motor comprising a magnet and a coil, but it may take a structure using electromagnets.

Figure 6:
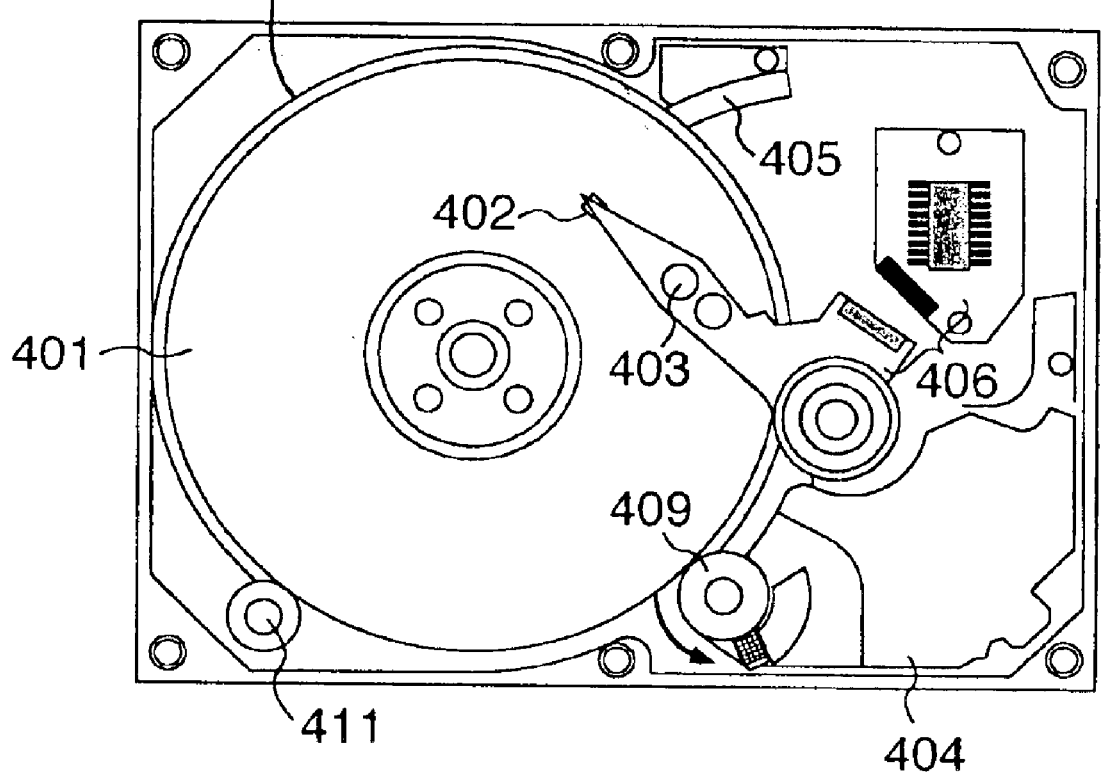
FIG. 6 is a view showing a structure of a second embodiment of the magnetic disk apparatus of the invention.

FIG. 6 shows a second embodiment of the magnetic disk apparatus of the present invention. Components similar to those in the first embodiment shown in FIG. 3 are denoted by the same numerals. The difference between the first and second embodiments is a disk latch mechanism 409.

The disk latching mechanism 409 latches the disk 401 when a tension belt 410 is pulled from a fixed shaft 411 towards the edge of the disk 401 as denoted by an arrow while the disk 401 is being stopped. Depending on the position of the fixed shaft 411, a force to move the disk 401 in the radial direction thereof acts by the action of the disk latch mechanism 409. It is preferable that the fixed shaft 411 is positioned closer to a shaft of the disk latch mechanism 409.

In these embodiments, the disk 401 is latched by the force acting in the radial direction. Therefore, there is a possibility that the disk 401 is deviated from its proper rotational center. This possibility, however, is diminished by setting a servo band wider and passing through a high-pass filter which removes the primary component of rotational synchronization vibration (run-out), and with this means, the write/read operation can be performed without trouble. Further, there is a possibility that wear powder generated from the direct contact of the disk and the tension belt/ the pad results sliding fault between the disk and the head. This possibility, however, is diminished by making the pad 30 of rubber material and the tension belt 410 of metal material.

Figure 7:
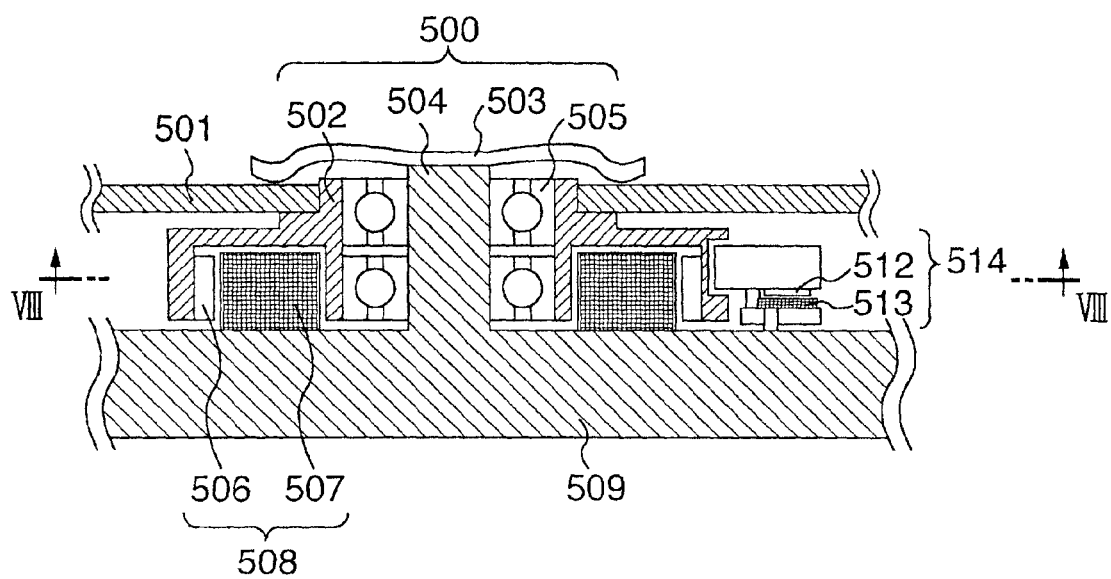
FIG. 7 is a sectional view showing a structure of a disk latch mechanism of a third embodiment of the magnetic disk apparatus of the invention.
Figure 8:
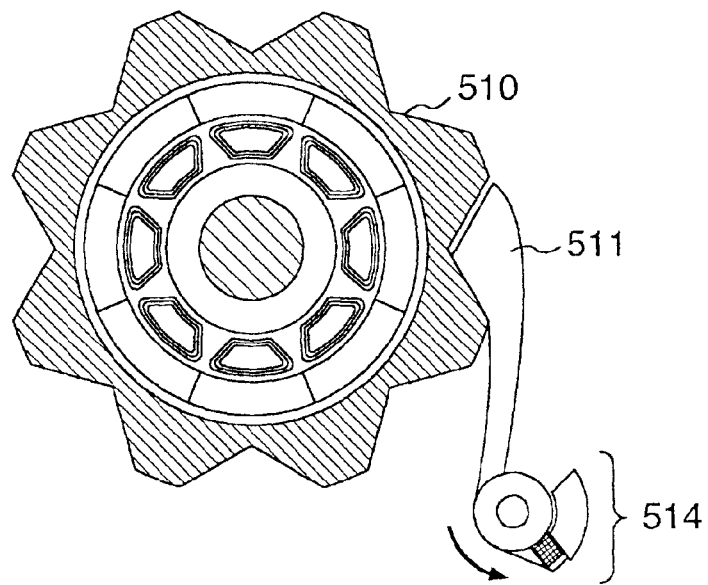
FIG. 8 is a sectional view taken along line VIII—VIII in FIG. 7.

FIGS. 7 and 8 show a third embodiment of the magnetic disk apparatus of the invention. FIGS. 7 and 8 are a vertical and a horizontal cross sectional view of only part of the magnetic disk and some parts around a spindle 500. A magnetic disk 501 is fastened to a hub 502 by a clamp 503 and screws (not shown). The spindle 500 is positioned on a base 509 and includes a spindle motor 508 comprising a shaft 504, bearings 505 disposed around the shaft 504, a magnet 506 and a coil 507. The hub 502 has a plurality of notches 510 formed at an outer periphery thereof. A latch mechanism 514 comprises a latch 511 which can engage with the notches 510, a magnet 512 fixed on the latch 511 and a coil 513 provided on the base 509. When the coil 513 is energized, the magnet 512 receives an electromagnetic force so that the latch 511 rotates in a direction shown by an arrow. As a result, the latch 511 engages with the notches 510 to fix the hub 502. That is to say, the disk 501 is latched.

Figure 9:
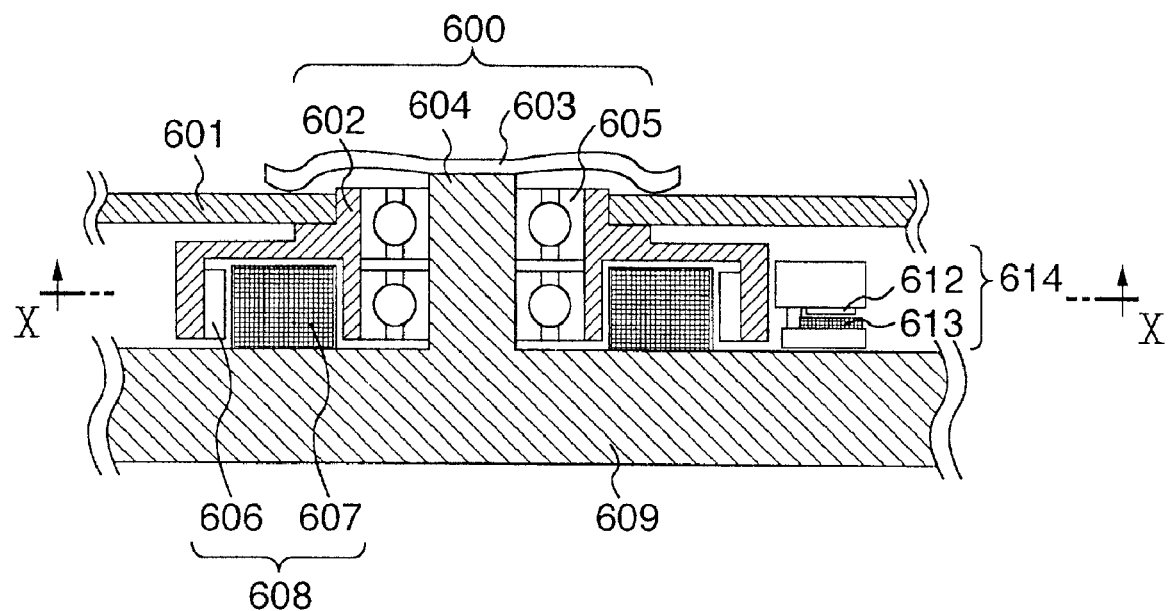
FIG. 9 is a sectional view showing a structure of a disk latch mechanism of a fourth embodiment of the magnetic disk apparatus of the invention.
Figure 10:
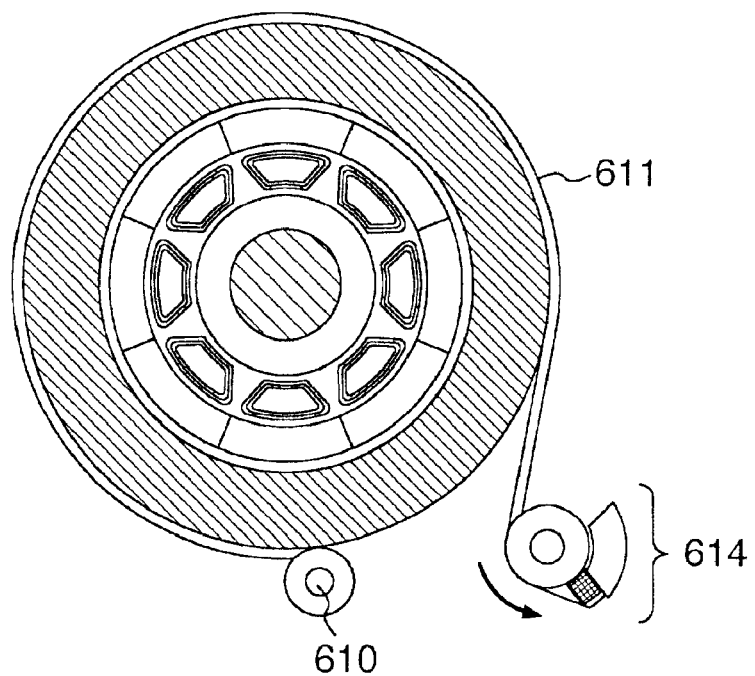
FIG. 10 is a sectional view taken along line X—X in FIG. 9.

FIGS. 9 and 10 show a fourth embodiment of the magnetic disk apparatus of the invention. The idea of the latch mechanism of the second embodiment shown in FIG. 6 is incorporated into this fourth embodiment. That is, one end of a tension belt 611 is fixed to a fixed shaft 610 and the tension belt 611 is wound on an outer surface of the hub 602 and the other end of the tension belt 611 is connected to a latch mechanism 614. The latch mechanism 614 comprises a magnet 612 and a coil 613. The action of the latch mechanism 614 is the same as that of the second embodiment shown in FIG. 6.

In these third and fourth embodiments, the latch mechanism is provided at the hub portion of the spindle motor. Consequently, even if a large force is applied to latch the disk, there is no risk to deform the disk or to result wear of the disk and the deviation of the rotating center of the disk. Therefore, the third and fourth embodiments can latch the disk more effectively than the first and second embodiments in which the magnetic disk is latched at an edge portion thereof. Further, it is possible to avoid the fretting wear of the bearing resulted from the external impact and vibration.

Figure 11:
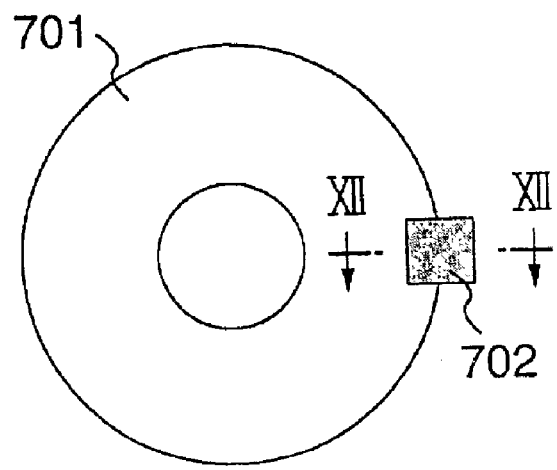
FIG. 11 is an explanatory view showing a structure of a magnetic disk latch mechanism of a fifth embodiment of the magnetic disk apparatus of the invention.
Figure 12A:
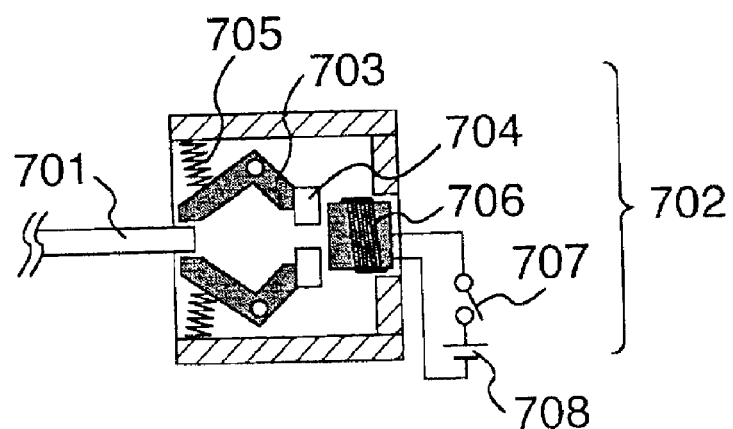
FIG. 12A is a sectional view taken along line XII—XII in FIG. 11 and showing a disk latched state of the magnetic disk latch mechanism shown in FIG. 11.
Figure 12B:
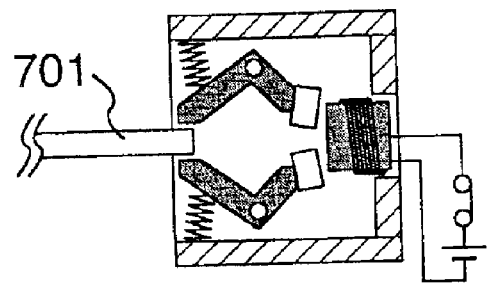
FIG. 12B is a sectional view taken along line XII—XII in FIG. 11 and showing a disk unlatched state of the magnetic disk latch mechanism shown in FIG. 11.

FIGS. 11, 12A and 12B show a fifth embodiment of the magnetic disk apparatus of the present invention. A latch mechanism 702 is provided at an outer periphery of a magnetic disk 701. The latch mechanism 702 comprises a pair of arms 703, magnets 704, springs 705, an electromagnet 706 comprising an iron core and a coil, a switch 707 and an electric power source 708. The electromagnet 706 is energized when the switch 707 is turned on.

When a write/read command is not issued from a host apparatus, forward ends of the arms 703 clamp an end portion of the disk 701 with a pressing force of the springs 705 to latch the disk 701 as shown in FIG. 12A. When a write/read command is issued from the host apparatus and the disk rotates, the switch 707 is turned on and the electromagnet 706 is energized. The polarities of the magnets 704 and the electromagnet 706 of sides opposite to each other are set to be the same. Therefore, when the electromagnet 706 is energized, they react on each other, so that the forward ends of the arms 703 are separated from the disk as shown in FIG. 12B.

Figure 13:
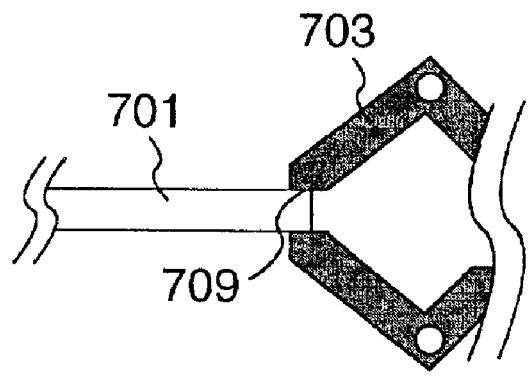
FIGS. 13 through 15 respectively show shapes of an arm of the disk latch mechanism shown in FIG. 11.
Figure 14:
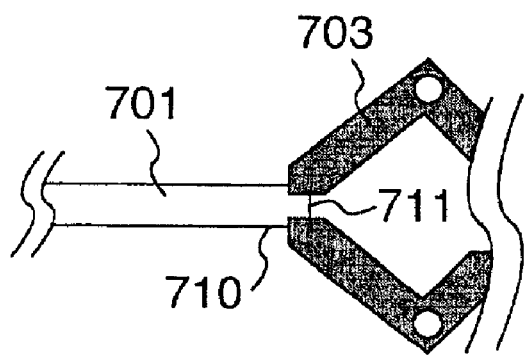
Figure 15:
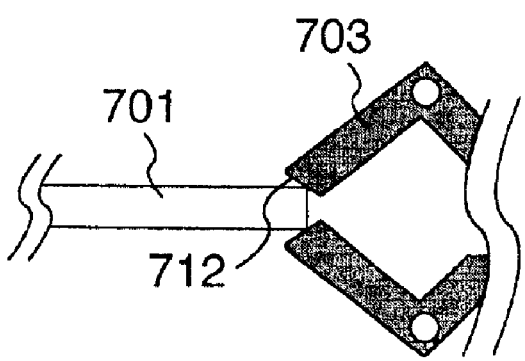

FIGS. 13, 14 and 15 show some modifications of shape of the forward ends of the arms 703. In a modification shown in FIG. 13, contact surfaces 709 of the arm 703 against the disk 701 are made in parallel to a surface of the disk 701. In this modification, the disk 701 is latched in a vertical direction by being clamped at a top and a back surface thereof and is latched in a radial direction by frictional force between the surfaces 709 and the surfaces of the disk 701.

In the modification shown in FIG. 13, there is a possibility that the disk is moved in the radial direction when a larger force than the frictional force is applied to the disk 701. A modification shown in FIG. 14 can reduce such possibility. Concretely, a contact surface 710 of the arm 703 comprises two surfaces comprising a surface in parallel to the disk surface and a surface 711 in parallel to a side surface of the disk 701. This modification can prevent deviation of the disk in the radial direction.

FIG. 15 shows another modification of the forward end of the arm 703. The forward end has a planar surface 712 which comes into contact with the edge of the disk in a predetermined angle so that the disk can be effectively latched in a vertical direction and a radial direction.

In any case, it is preferable that the forward end of the arm 703 is formed with a material softer than the disk 701 such as rubber.

Figure 16:
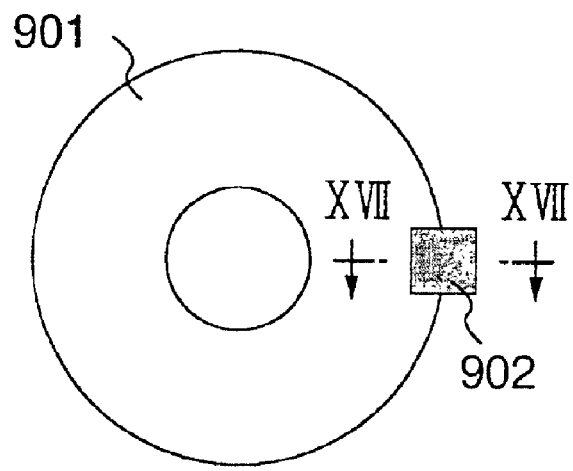
FIG. 16 is an explanatory view showing a structure of a magnetic disk latch mechanism of a sixth embodiment of the magnetic disk apparatus of the invention.
Figure 17A:
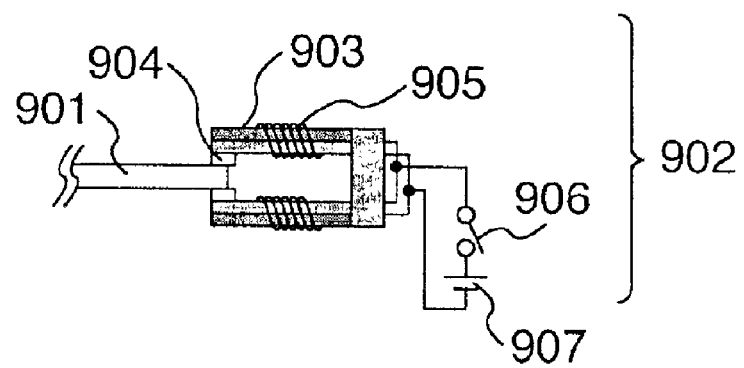
FIG. 17A is a sectional view taken along line XVII—XVII in FIG. 16 and showing a disk latched state of the magnetic disk latch mechanism shown in FIG. 16.
Figure 17B:
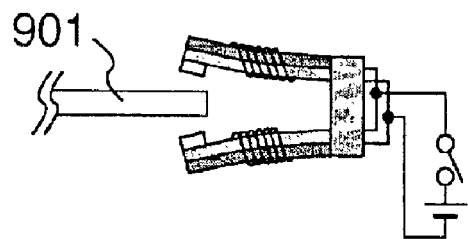
FIG. 17B is a sectional view taken along line XVII—XVII in FIG. 16 and showing a disk unlatched state of the magnetic disk latch mechanism shown in FIG. 16.

FIGS. 16, 17A and 17B show a sixth embodiment of the magnetic disk apparatus of the present invention.

In this embodiment, a latch mechanism 902 is provided at an outer periphery of the magnetic disk 901. The latch mechanism 902 comprises bimetal arms 903, pads 904, heating wires 905 wound around the bimetal arms 903, a switch 906 and an electric power source 907. The bimetal arm 903 is formed by laminating aluminum whose coefficient of expansion is 23.1 ($1/K \times 10^{-6}$) and iron whose coefficient of expansion is 11.8 ($1/K \times 10^{-6}$). When heat is applied to the bimetal arm 903 through the heating wire 905 by turning ON the switch 906, the aluminum side is extended larger than the iron side, so that the bimetal arm 903 is bent towards the iron side. In this embodiment, the bimetal arms 903 are arranged so that the aluminum sides are opposite to each other.

When a write/read command is not issued from a host apparatus, the pads 904 of the two arms 903 clamp an end portion of the disk 901 to latch it as shown in FIG. 17A. When a write/read command is issued from the host apparatus and the disk rotates, the switch 906 is turned on and the heating wires 905 are energized. As described above, the bimetal arms 903 are arranged so that the aluminum sides are opposite to each other. Therefore, the arms 903 are outwardly bent to unlatch the disk as shown in FIG. 17B.

Figure 18:
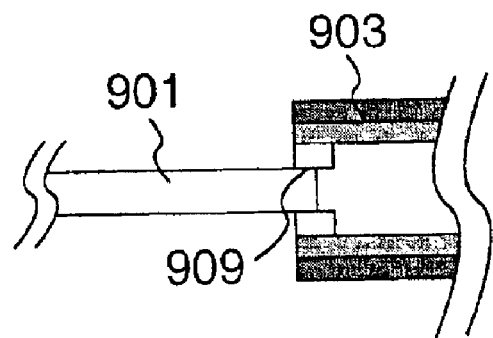
FIGS. 18 through 20 respectively show shapes of an arm of the disk latch mechanism shown in FIG. 16.
Figure 19:
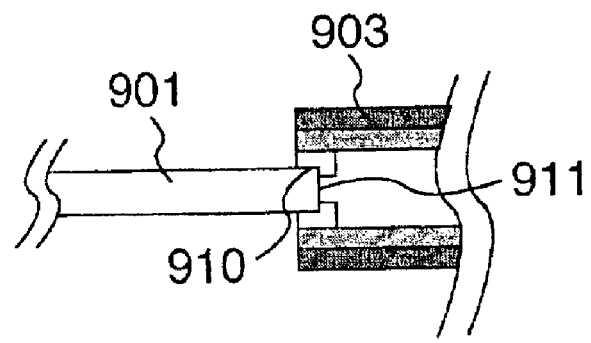
Figure 20:
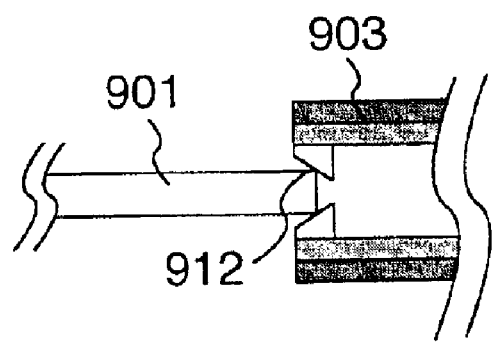

FIGS. 18, 19 and 20 show some modifications of shape of the pads 904 of the arms 903. In a modification shown in FIG. 18, contact surfaces 909 of the pads 904 of the arms 903 with the disk 901 are made in parallel to a surface of the disk 901. In this modification, the disk 901 is latched in a vertical direction by being clamped at a top and a back surface thereof and is latched in a radial direction by frictional force between the surfaces 909 and the disk 901.

In the modification shown in FIG. 18, there is a possibility that the disk is moved in the radial direction when a larger force than the frictional force is applied to the disk 901. A modification shown in FIG. 19 can reduce such possibility. Concretely, a pad 904 of the arm 903 comprises two surfaces; a surface 910 in parallel to the disk surface and a surface in parallel to a side surface 911 of the disk 901. This modification can prevent deviation of the disk in the radial direction.

FIG. 20 shows another modification of the pad 904 of the arm 903. The pad has a planar surface 912 which comes into contact with the edge of the disk in a predetermined angle so that the disk can be effectively latched in a vertical direction and a radial direction.

In any case, it is preferable that the pad 904 is formed with a material softer than the disk 901 such as rubber.

Figure 21:
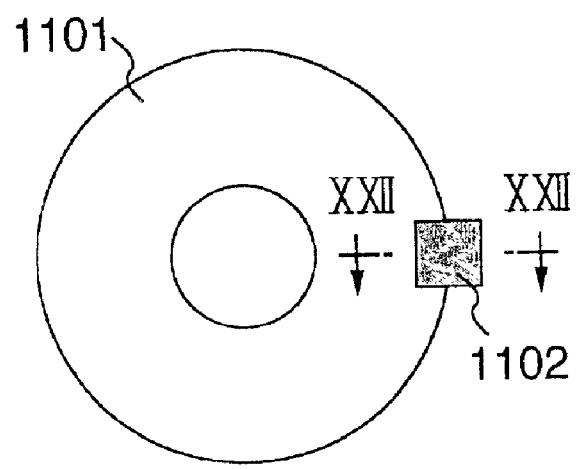
FIG. 21 is an explanatory view showing a structure of a magnetic disk latch mechanism of a seventh embodiment of the magnetic disk apparatus of the invention.
Figure 22A:
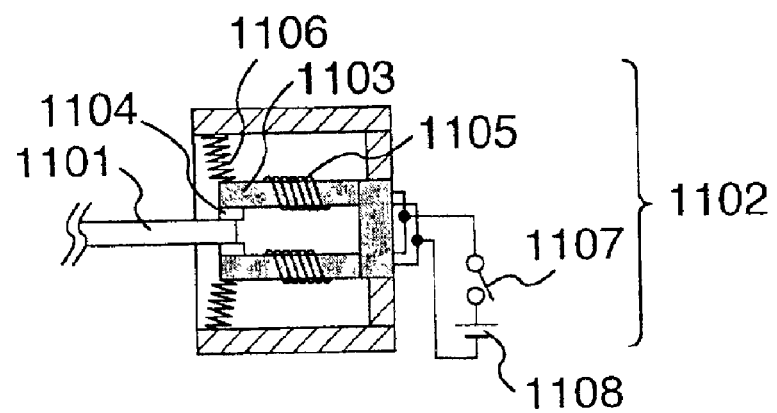
FIG. 22A is a sectional view taken along line XXII—XXII in FIG. 21 and showing a disk latched state of the magnetic disk latch mechanism shown in FIG. 21.
Figure 22B:
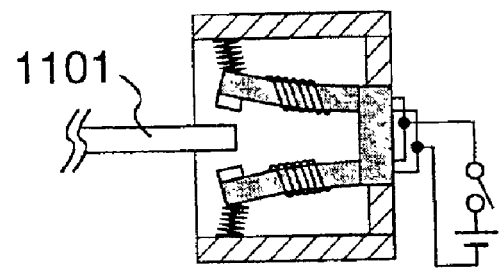
FIG. 22B is a sectional view taken along line XXII—XXII in FIG. 21 and showing a disk unlatched state of the magnetic disk latch mechanism shown in FIG. 21.

FIGS. 21, 22A and 22B show a seventh embodiment of the magnetic disk apparatus of the present invention. A latch mechanism 1102 is provided at an outer periphery of the magnetic disk 1101. The latch mechanism 1102 comprises arms made of a shape memory alloy 1103, pads 1104, heating wires 1105 wound around the arms 1105, springs 1106, a switch 1107 and an electric power source 1108.

When a write/read command is not issued from a host apparatus, the pads 1104 of the arms 1103 clamp an end portion of the disk 1101 with the force of the springs 1106 to latch it as shown in FIG. 22A. When a write/read command is issued from the host apparatus and the disk rotates, the switch 1107 is turned on and the heating wires 1105 are energized. Therefore, the arms 1103 are outwardly bent against the spring force to unlatch the disk 1101 as shown in FIG. 22B.

Figure 23:
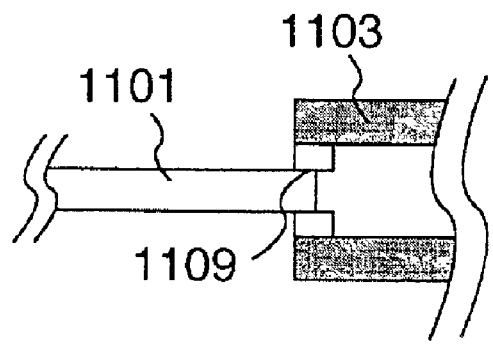
FIGS. 23 through 25 respectively show shapes of an arm of the disk latch mechanism shown in FIG. 21.
Figure 24:
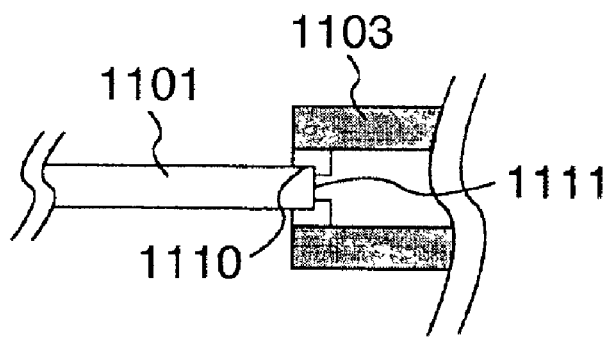
Figure 25:
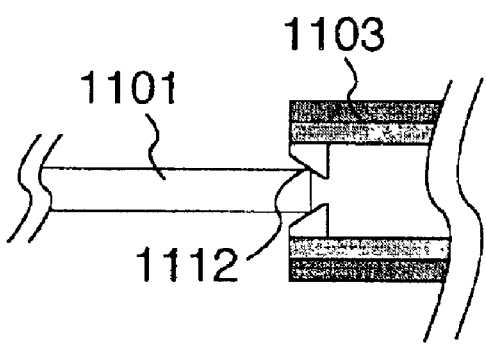

FIGS. 23, 24 and 25 show some modifications of shape of the pads 1104 of the arms 1103. In a modification shown in FIG. 23, contact surfaces 1109 of the pads 1104 of the arms 1103 against the disk 1101 are made in parallel to a surface of the disk 1101. In this modification, the disk 1101 is latched in a vertical direction by being clamped at a top and a back surface thereof and is latched in a radial direction by frictional force between the surfaces 1109 and the disk 1101.

In the modification shown in FIG. 23, there is a possibility that the disk is moved in the radial direction when a larger force than the frictional force is applied to the disk 1101. A modification shown in FIG. 24 can reduce such possibility. Concretely, the pad 1104 of the arm 1103 comprises two surfaces comprising a surface 1110 in parallel to the disk surface and a surface in parallel to a side surface 1111 of the disk 1101. This modification can prevent deviation of the disk in the radial direction.

FIG. 25 shows another modification of the pad 1104 of the arm 1103. The pad has a planar surface 1112 which comes into contact with the edge of the disk in a predetermined angle so that the disk can be effectively latched in a vertical direction and a radial direction.

In any case, it is preferable that the pad 1104 is formed with a material softer than the disk 1101 such as rubber.

Figure 26:
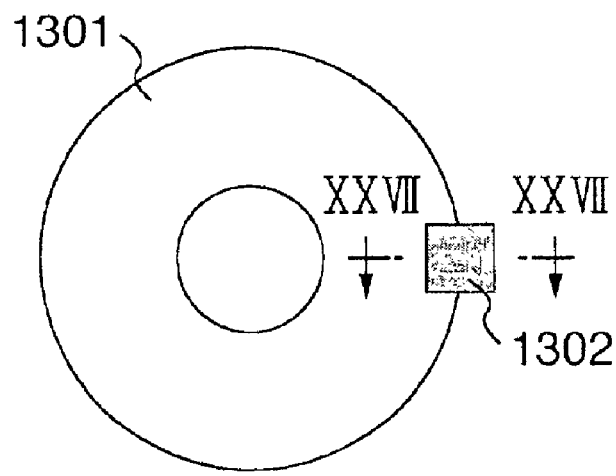
FIG. 26 is an explanatory view showing a structure of a magnetic disk latch mechanism of an eighth embodiment of the magnetic disk apparatus of the invention.
Figure 27A:
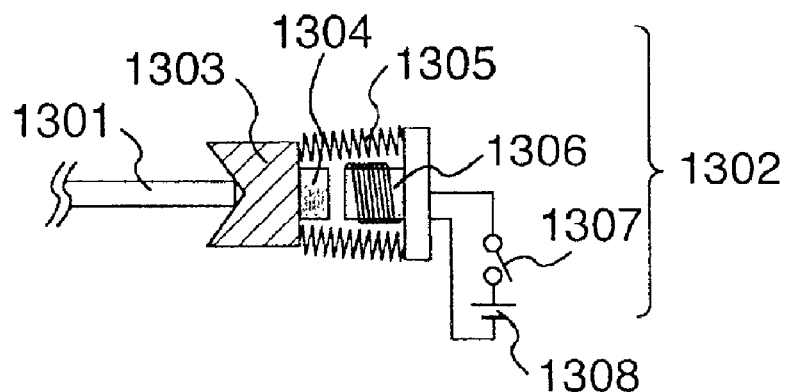
FIG. 27A is a sectional view taken along line XXVII—XXVII in FIG. 26 and showing a disk latched state of the magnetic disk latch mechanism shown in FIG. 26.
Figure 27B:
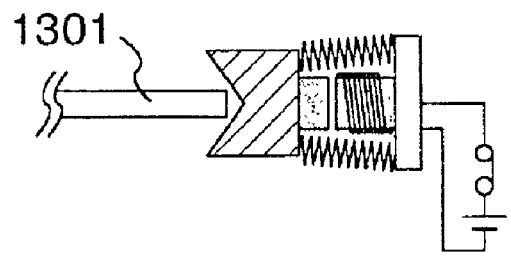
FIG. 27B is a sectional view taken along line XXII—XXII in FIG. 26 and showing a disk unlatched state of the magnetic disk latch mechanism shown in FIG. 26.

FIGS. 26, 27A and 27B show an eighth embodiment of the magnetic disk apparatus of the present invention. In this embodiment, a latch mechanism 1302 is provided at an outer periphery of a magnetic disk 1301. The latch mechanism 1302 comprises a pad 1303, a magnet 1304 attached on the pad 1303, springs 1305 for urging the pad 1303 against the disk 1301, an electromagnet 1306 comprising an iron core and a coil, a switch 1307 and an electric power source 1308. The polarity of the magnet 1304 and the electromagnet 1306 are set so as to attract each other.

When a write/read command is not issued from a host apparatus, the pad 1303 is urged by the springs 1305 so as to press the disk 1301 at an edge portion thereof in the radial direction to latch the disk 1301 as shown in FIG. 27A. When a write/read command is issued from the host apparatus, the switch 1307 is turned on and the electromagnet 1306 is energized. As described above, the polarity of the magnet 1304 and the electromagnet 1306 are set so as to attract each other. Therefore, when the electromagnet 1306 is energized, it attracts the magnet 1304 and therefore, the pad 1303 is separated from the disk 1301 to unlatch the disk. Also in this embodiment, it is preferable that the pad 1303 is formed by material softer than the disk 1301 such as rubber.

Figure 28:
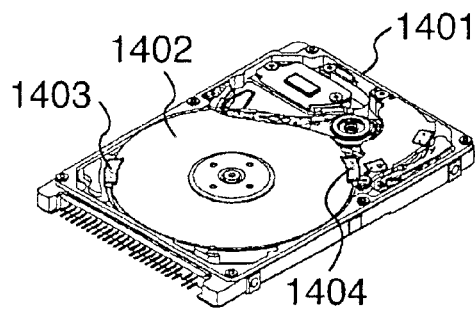
FIG. 28 is a perspective view of the magnetic disk apparatus of the invention.
Figure 29:
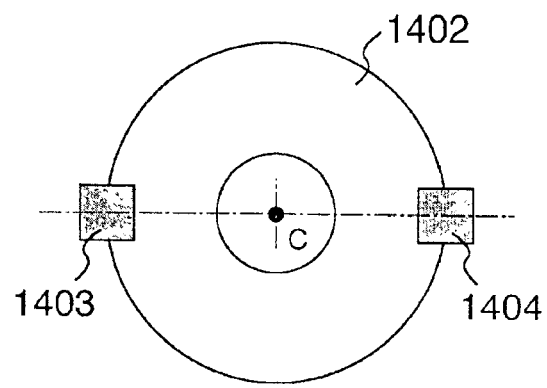
FIG. 29 is an explanatory view showing an arrangement of the magnetic disk latch mechanism of the magnetic disk apparatus of the invention, shown in FIG. 28.

It is preferable to provide a plurality of disk latch mechanism to reduce the deviation of the disk from its original center upon latching. FIGS. 28 and 29 show an example of an arrangement of the disk latch mechanism. In this example, the disk latch mechanisms 1403 and 1404 are disposed symmetrically with respect to the center c of the magnetic disk 1402. When this arrangement is applied to the eighth embodiment shown in FIGS. 26, 27A and 27B, the spring constant k1 of the spring 1305 for the disk latch mechanism 1403 equals to the spring constant k2 for the disk latch mechanism 1404.

$$k1 = k2 \tag{1}$$

Figure 30:
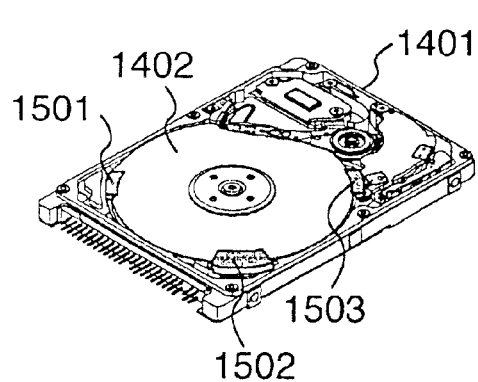
FIG. 30 is a perspective view of the magnetic disk apparatus of the invention.
Figure 31:
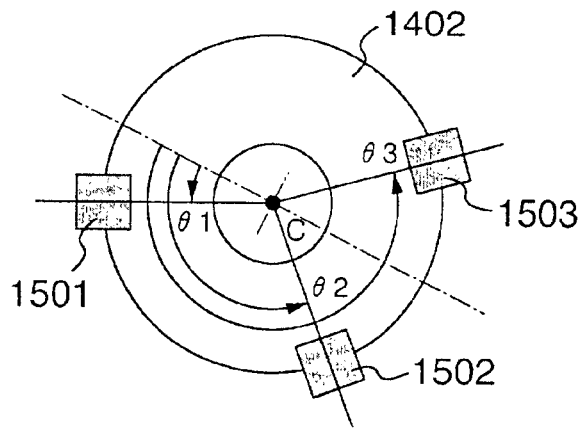
FIG. 31 is an explanatory view showing an arrangement of the magnetic disk latch mechanism of the magnetic disk apparatus of the invention, shown in FIG. 31.

In the case where a slight time lug occurs between the disk latching operations of the latch mechanisms 1403, 1404, the first latching operation might cause the disk to be deviated. In order to reduce such trouble, it is effective to increase the number of disk latch mechanisms. FIGS. 30 and 31 show such an example in which three disk latch mechanisms 1501, 1502, 1503 are disposed at an outer periphery of the disk 1402. When this arrangement is applied to the eighth embodiment, the relationship among the spring constants k1, k2, k3 of the disk latch mechanisms 1501, 1502, 1503 should satisfy the following relationships (2) and (3).

$$k1 \cos \theta1 + k2 \cos \theta2 + k3 \cos \theta3 = 0 \tag{2}$$

$$k1 \sin \theta1 + k2 \sin \theta2 + k3 \sin \theta3 = 0 \tag{3}$$

Figure 32:
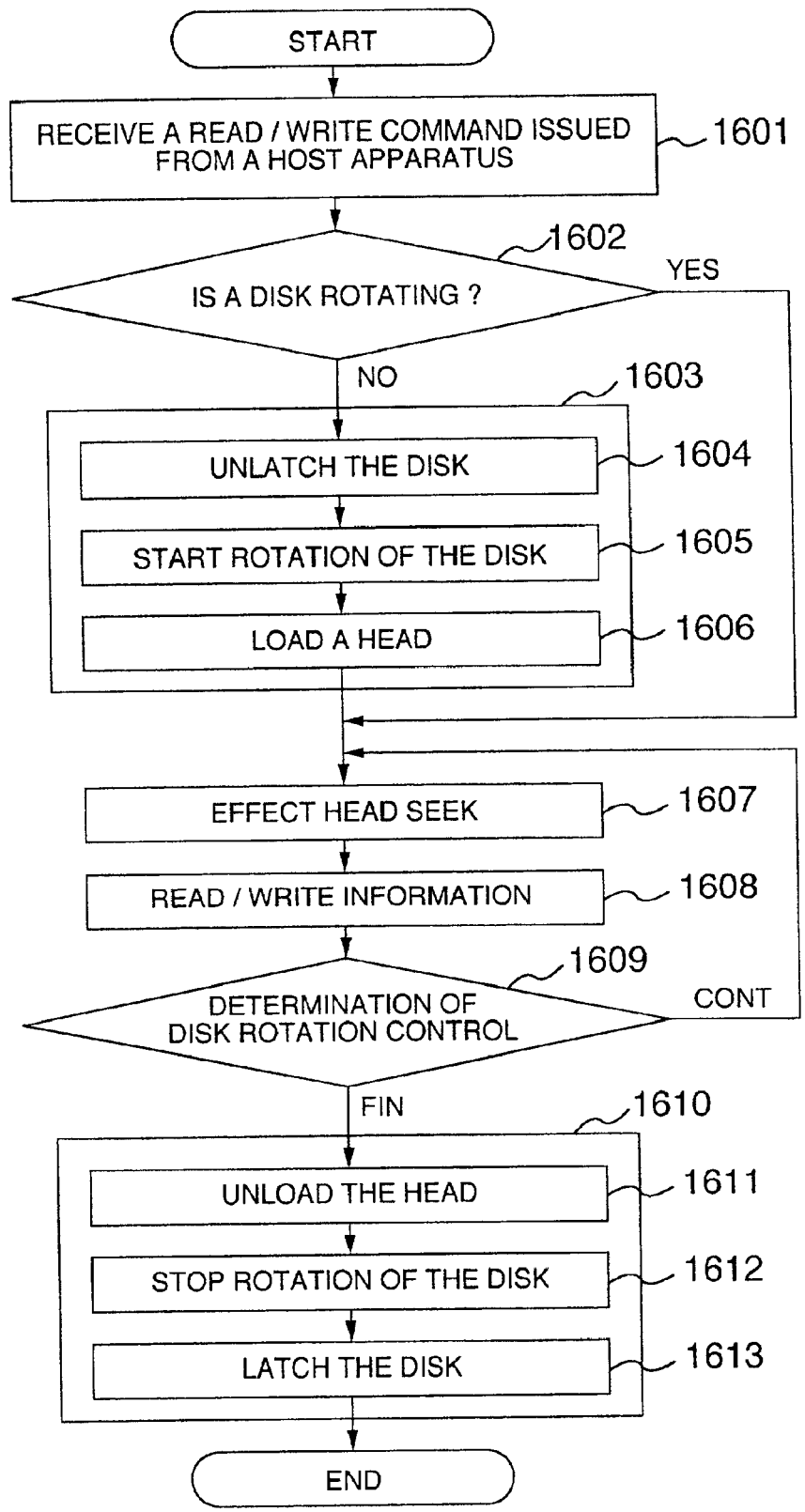
FIG. 32 is a flowchart showing a sequence of information writing/reading to the magnetic disk apparatus of the present invention.
Figure 33:
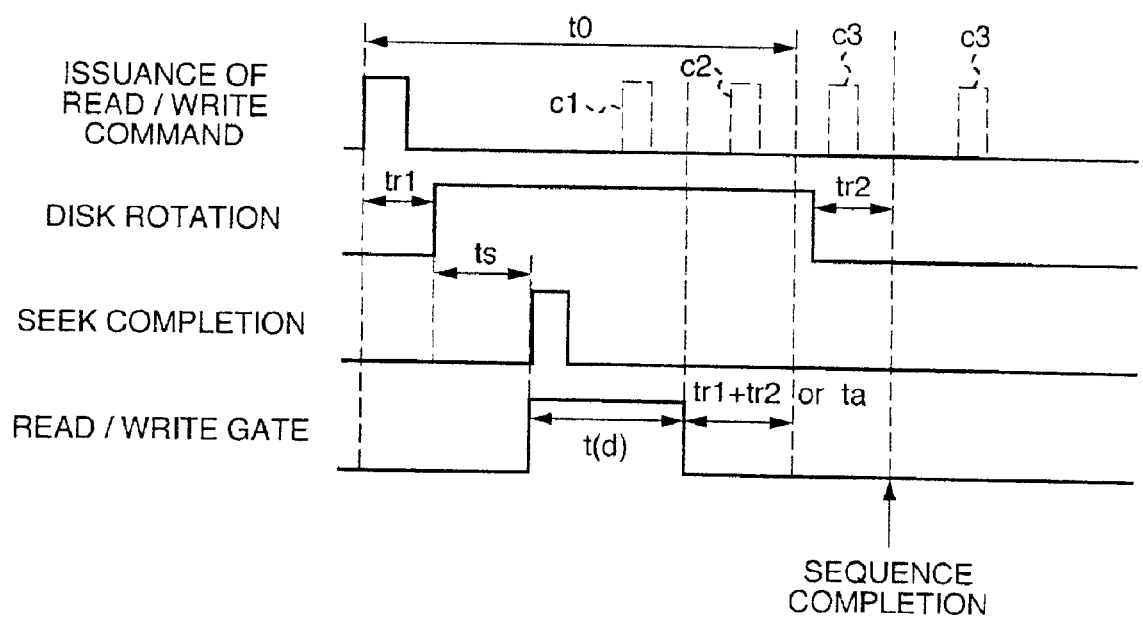
FIG. 33 is an explanatory view of timings for issuing a read/write command and an operation of each latch mechanism.

Referring to FIGS. 32 and 33, an operation of the magnetic disk apparatus of the invention will be described.

In FIG. 32, there is enough time interval between the last sequence of latching the disk and next unlatching the disk if the write/read command from the host issued in rapid succession.

It is preferable to wait closing (ending) above sequence during an optimal time interval. The optimal time interval is defined such as minimizing power consumption, for example.

When a write/read command from the host apparatus is received (step 1601), whether or not the magnetic disk is rotating is decided (step 1602). When the disk is not rotating, a sequence for starting the rotation of the disk is effected (step 1603). In the disk rotation start sequence, firstly, a disk latched by a disk latch mechanism is unlatched (step 1604). Then, the rotation of the magnetic disk is started (step 1605). Furthermore, head loading (including unlatching operation of the head) is performed (step 1606). Thereafter, a head seek is effected, that is, the magnetic head is moved to a predetermined track (step 1607) to write/read necessary information on/from the magnetic disk (step 1608). After this operation is completed, a disk rotation control determination is performed (step 1609).

In the disk rotation control determination, if a subsequent write/read command is issued within a time period t0 subsequent to the issuance of the write/read command, the determination becomes "CONT", the operations of the head seek and the information write/read are repeated.

$$t0 = tr1 + ts + t(d) + (tr1 + tr2) \tag{4}$$

or $$t0 = tr1 + ts + t(d) + ta \tag{5}$$

where, the tr1 denotes a total time required for disk unlatching, disk rotation starting and head loading; ts denotes seeking time to a predetermined track; t(d) denotes a writing or reading time to be assumed as the function of the data amount d; tr2 denotes a total time required for head unloading, disk rotation stopping and disk latching; ta denotes an arbitrary time.

If the subsequent write/read command is not issued within the above time t0, the determination is "FIN" and a disk stop sequence is performed (step 1610). In the disk stop sequence, the head is unloaded (step 1611), the disk rotation is stopped (step 1612), and disk is latched (step 1613) sequentially. Then, the series of sequence is ended.

According to the above-described operations, as shown in FIG. 33, there is no need to perform the disk stop sequence tr2 and the disk rotation start sequence tr1 if a subsequent read/write command is issued within read/write time t(d) (c1) or till the time t0 (c2). The subsequent read/write operation can be performed faster. However, if the subsequent read/write command is issued at c3, there is need to wait for a time of tr1+tr2+ts at most. Thus, a predetermined time ta may be set by a user so as to select an efficient timing.

Of course, each latch mechanism of the present invention in each of the above-described embodiments latches movable parts of both disk and head continuously while the magnetic disk apparatus is not powered.

According to the present invention, it is possible to restrain the probability that the magnetic disk apparatus installed in a mobile computer and/or an information appliance receives damages from external impacts and vibrations occurred, for example, when the apparatus is dropped. Especially, the present invention enables to replace a small capacity semiconductor memory having been employed in a conventional information appliance with a large capacity magnetic disk apparatus, thereby expanding the use-purpose of such information appliances effectively.

What is claimed is:

1. A magnetic disk apparatus, comprising:

a magnetic disk having a magnetic film formed on a substrate;

a spindle motor for rotating said magnetic disk;

a magnetic head for writing/reading information on/from said magnetic disk;

a supporting member for supporting said magnetic head;

a driving mechanism for moving said magnetic head to a predetermined position on said magnetic disk;

a magnetic writing/reading circuit for enabling said magnetic head to write/read information on/from said magnetic disk;

an interface for sending/receiving signals for controlling said information to/from another information processing device, detection means for detecting whether or not the magnetic dish is being rotated; and a latching mechanism to latch a movable part of said magnetic disk or said spindle motor on the basis of detection result of said detection means that the magnetic disk is not being rotated.

2. The magnetic disk apparatus according to claim 1, wherein said detection means detects the rotation of the magnetic disk from at least one of a control signal sent/received to/from said information processing device via said interface and a voltage of power supplied from outside of the magnetic disk apparatus.

3. The magnetic disk apparatus according to claim 1, wherein said latching mechanism comprises a small motor comprising a coil and a magnet and a member for coming into contact with said movable part to hold it.

4. The magnetic disk apparatus according to claim 1, wherein said latching mechanism comprises an electromagnet.

5. The magnetic disk drive according to claim 1, wherein said latching mechanism comprises a mechanism in which bimetal is used.

6. The magnetic disk apparatus according to claim 1, wherein said latching mechanism comprises a mechanism in which a shape memory alloy is used.

7. A magnetic disk apparatus comprising:

a magnetic disk having a magnetic film formed on a substrate;

means for rotating said magnetic disk;

a magnetic head provided so as to face a surface of said magnetic disk;

means for positioning said magnetic head in a predetermined track on said magnetic disk;

a magnetic writing/reading circuit for enabling said magnetic head to write/read information along said track;

an interface means for sending/receiving the information and a signal to control the information to/from an external information processing device, and a latching mechanism to latch a movable part of the magnetic disk or the spindle motor, said latching mechanism unlatching said movable part when a specific command for reading/writing information from/onto said magnetic disk is issued from said information processing device and latching said movable part again after processing of said specific command is completed and the rotation of the magnetic disk is stopped.

8. The magnetic disk apparatus according to claim 7, wherein said latching mechanism detects the rotation of the magnetic disk from a voltage of power supplied from outside of the magnetic disk apparatus.

9. The magnetic disk apparatus according to claim 7, wherein said latching mechanism comprises a small motor comprising a coil and a magnet and a member for coming into contact with said movable part to hold it.

10. The magnetic disk apparatus according to claim 7, wherein said latching mechanism comprises an electromagnet.

11. The magnetic disk drive according to claim 7, wherein said latching mechanism comprises a mechanism in which bimetal is used.

12. The magnetic disk apparatus according to claim 7, wherein said latching mechanism comprises a mechanism in which a shape memory alloy is used.

* * * * *